(12) United States Patent
Bartlett et al.

(10) Patent No.: US 6,520,207 B2
(45) Date of Patent: Feb. 18, 2003

(54) COMBINATION POPPET AND GATE VALVE

(75) Inventors: Christopher D. Bartlett, Spring, TX (US); Christopher E. Cunningham, Spring, TX (US); Addrew J. Canning, Clydebank (GB); David E. Cain, Houston, TX (US); Taylor L. Jones, Houston, TX (US); Paulo A. Couto, Rio de Janeiro (BR)

(73) Assignee: FMC Technologies, Inc., Chicago, IL (US)

( * ) Notice: Subject to any disclaimer, the term of this patent is extended or adjusted under 35 U.S.C. 154(b) by 0 days.

(21) Appl. No.: 09/844,579

(22) Filed: Apr. 26, 2001

(65) Prior Publication Data

US 2002/0007856 A1 Jan. 24, 2002

Related U.S. Application Data

(60) Provisional application No. 60/199,795, filed on Apr. 26, 2000.

(51) Int. Cl.⁷ .................................................. F16L 37/28
(52) U.S. Cl. ............................. 137/614.19; 137/614.18
(58) Field of Search ........................... 137/613, 614.11, 137/614.19, 614.18; 166/316, 319, 332.1, 332.4

(56) References Cited

U.S. PATENT DOCUMENTS

| | | | | |
|---|---|---|---|---|
| 3,612,354 A | * | 10/1971 | Sitton et al. | ........ 137/614.19 X |
| 4,471,943 A | | 9/1984 | Nelson | |
| 5,127,436 A | * | 7/1992 | Campion et al. | ... 137/614.19 X |
| 5,143,158 A | | 9/1992 | Watkins et al. | |
| 5,836,352 A | * | 11/1998 | Nimberger | ............. 137/614.19 |

\* cited by examiner

*Primary Examiner*—Kevin Lee
(74) *Attorney, Agent, or Firm*—Henry C. Query, Jr.

(57) ABSTRACT

The present invention is directed to a valve for controlling the flow of fluid through a component which includes a flow conduit extending therethrough. The valve comprises a first closure member for controlling the flow of fluid through the conduit, a second closure member for controlling the flow of fluid through the conduit, and a valve stem which is connected to both the first and second closure members. The stem is responsive to an external force to move the first and second closure members from a closed position, in which the fluid is blocked from flowing through the conduit by both the first and second closure members, to an open position, in which the fluid is permitted to flow through the conduit past both the first and second closure members.

21 Claims, 10 Drawing Sheets

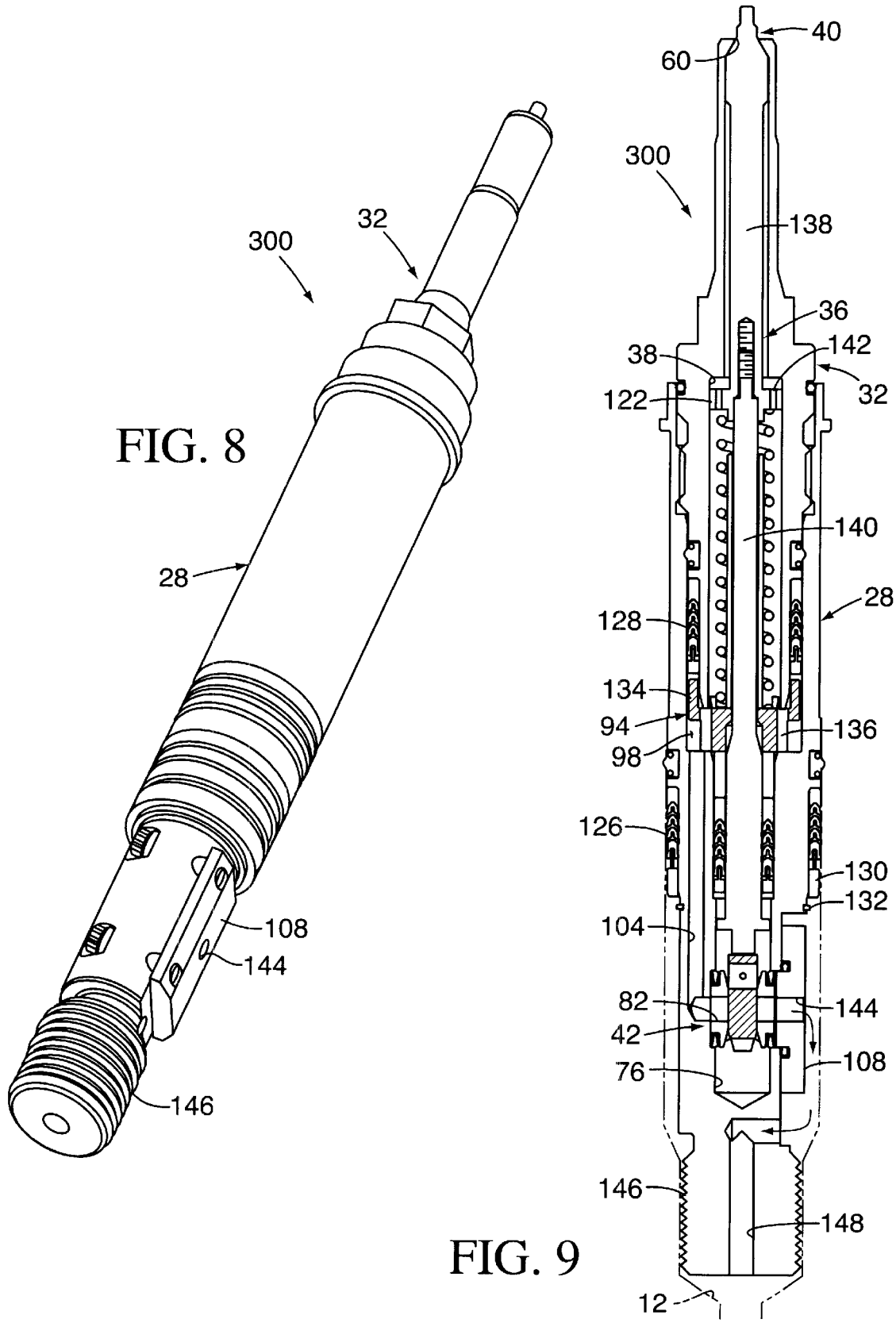

COMBINATION POPPET AND GATE VALVE

This application is based on U.S. Provisional Patent Application No. 60/199,795, which was filed on Apr. 26, 2000.

BACKGROUND OF THE INVENTION

The present invention relates to a closure device for controlling the flow of fluid through a conduit. More particularly, the invention relates to a valve which comprises both a poppet type closure member and a gate closure member which are actuated simultaneously to open and close the valve.

In flow completion systems for oil and gas wells, closure devices are often employed to isolate the conduits within various flow completion system components from the external environment. For example, a poppet type valve such as the male or female member of a conventional hydraulic coupling may be used to isolate a service and control conduit within a tubing hanger when the coupler is not engaged by a corresponding coupler on the tubing hanger running tool or the tubing spool. However, this type of closure device is prone to leakage and is therefore unreliable as a primary closure device.

One solution to this problem is to provide a second, more reliable closure device in the conduit. However, because of the space and weight limitations inherent in many flow completion system components, the use of two closure devices in a single conduit is often not possible. In addition, the second closure device typically must be actuated independently of the first closure device. This usually requires that the flow completion system component be provided with suitable conduits to communicate an actuating fluid to the second closure device, and this necessarily complicates the design of the flow completion system component.

SUMMARY OF THE INVENTION

In accordance with the present invention, these and other disadvantages in the prior art are overcome by providing a valve for controlling the flow of fluid through a component which includes a flow conduit extending therethrough, the valve comprising a first closure member for controlling the flow of fluid through the conduit, a second closure member for controlling the flow of fluid through the conduit, a valve stem which is connected to both the first and second closure members, and a spring for biasing the first and second closure members into a first position. The stem is responsive to an external force to move the first and second closure members from the first position to a second position. Moreover, one of the first and second positions corresponds to an open position of the valve, in which the fluid is permitted to flow through the conduit past both the first and second closure members, and the other position corresponds to a closed position of the valve, in which the fluid is blocked from flowing through the conduit by both the first and second closure members.

In one embodiment of the invention, the first closure member comprises a poppet head which is adapted to engage a corresponding poppet seat surrounding an opening that is in fluid communication with the conduit. In addition, the second closure member comprises a gate which is slidably positioned between a pair of seats which each comprise a through bore that is in fluid communication with the conduit. The valve preferably also comprises a valve bonnet which includes a male coupling portion that is adapted to connect with a female coupling member of a hydraulic coupler, and the valve stem comprises an actuating tip that is adapted to be engaged by a corresponding portion of the female coupling member to move the valve stem and thus the first and second closure members from the first position to the second position. In this manner, when the female coupling member is connected to the valve, the valve stem will actuate both the poppet closure member and the gate closure member to thereby open the conduit. Similarly, when female member is disconnected from the valve, the spring will return the poppet closure member and the gate closure member to the closed position to thereby seal the conduit.

Thus, the valve of the present invention provides two barriers between the conduit and the environment in a single device. Moreover, the second closure member is preferably a gate valve, which is recognized in the flow control industry as being a robust and reliable valve. In addition, since the first and second closure members are connected by the valve stem, the second closure member is actuated upon actuation of the first closure member. Consequently, no need exists for separate control signals to actuate the second closure member.

These and other objects and advantages of the present invention will be made apparent from the following detailed description, with reference to the accompanying drawings. In the drawings, the same reference numbers are used to denote similar components in the various embodiments.

BRIEF DESCRIPTION OF THE DRAWINGS

FIG. 8 is a perspective view of another embodiment of the valve of the present invention;

FIG. 9 is a cross-sectional view of the valve shown in FIG. 8;

DETAILED DESCRIPTION OF THE PREFERRED EMBODIMENTS

The valve of the present invention comprises both a poppet closure member and a gate closure member which are disposed across a common flow passage. Thus, the valve comprises both the primary and the secondary closure members for the flow passage in a single component. Moreover, the poppet and gate closure members are connected by a valve stem and are therefore actuated simultaneously. In the preferred embodiment of the invention, the poppet closure member is adapted to be engaged by the female member of a conventional hydraulic coupling. Thus, when the valve is connected with the female member, the female member will push the poppet and gate closure members into the open position. Furthermore, the valve preferably includes a return biasing means to move the poppet and gate closure members back to the closed position when the female member is disengaged from the valve.

The valve of the present invention is therefore particularly useful in isolating a fluid conduit from the environment. When the conduit is connected with another fluid conduit having a female member attached thereto, the valve will allow for the free flow of fluid between the fluid conduits. Alternatively, an external actuator could be employed to engage the valve and thereby allow the fluid in the conduit to flow into a chamber or other controlled environment. Many other variations of the present invention may be envisioned by one of skill in the art. Therefore, while the invention will be described in connection with a service and control conduit in a tubing hanger component of a flow completion system, it should be understood that the present invention should not be limited by this specific application. For example, the valve of the invention could be employed to control the flow of fluid through an annulus bore in a tubing hanger, or through any other type of fluid conduit in general.

Figure 1:
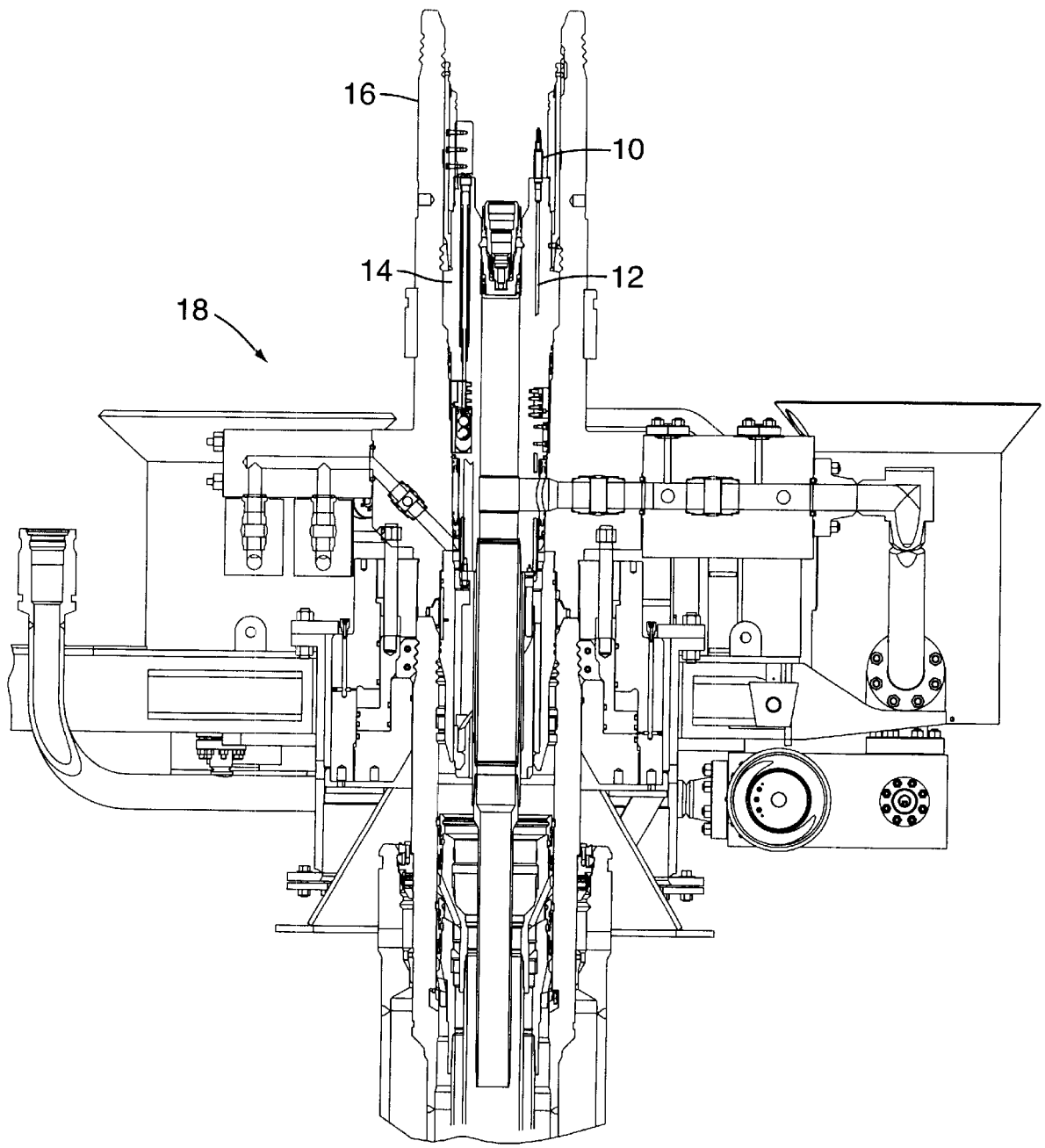
FIG. 1 is a partial cross-sectional view of an exemplary flow completion system having a tubing hanger in which the valve of the present invention is installed.
Figure 2:
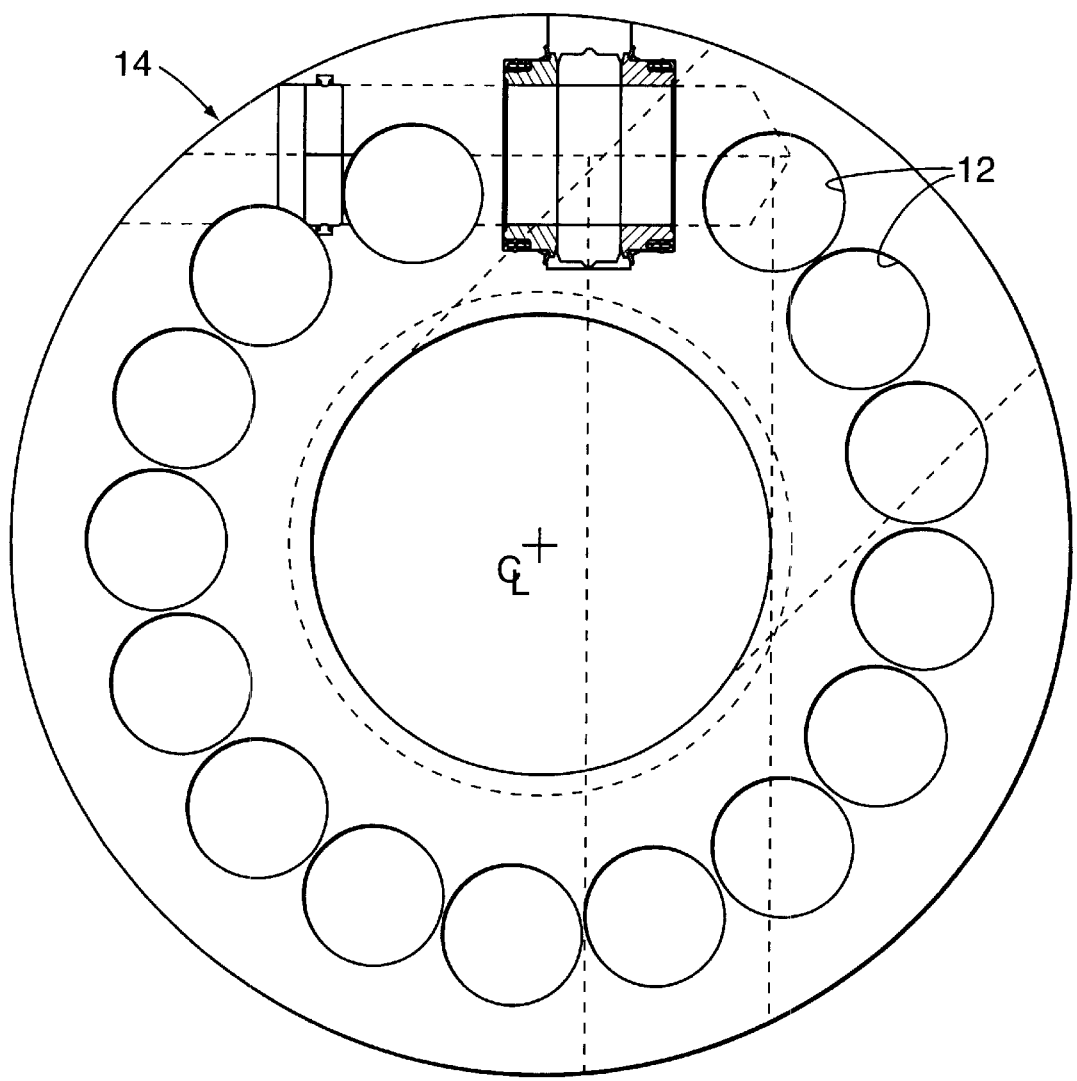
FIG. 2 is a top view of the tubing hanger component of the flow completion system shown in FIG. 1.

Referring to FIG. 1, the valve of the present invention, which is indicated generally by reference number 10, is shown installed in the top end of a service and control conduit 12 extending through a tubing hanger 14 which is landed in a Christmas tree or tubing spool 16 of an exemplary flow completion system 18. As shown in FIG. 2, the tubing hanger 14 may comprise a plurality of service and control conduits 12 spaced radially about the axial centerline CL of the tubing hanger, and a separate valve 10 (not shown in FIG. 2) may be installed in each of one or more such conduits. When the tubing hanger 14 is not engaged by an external tool, controls bridge or similar device, the valve 10 serves to isolate the service and control conduit 12 from the sea or other external environment.

Figure 3:
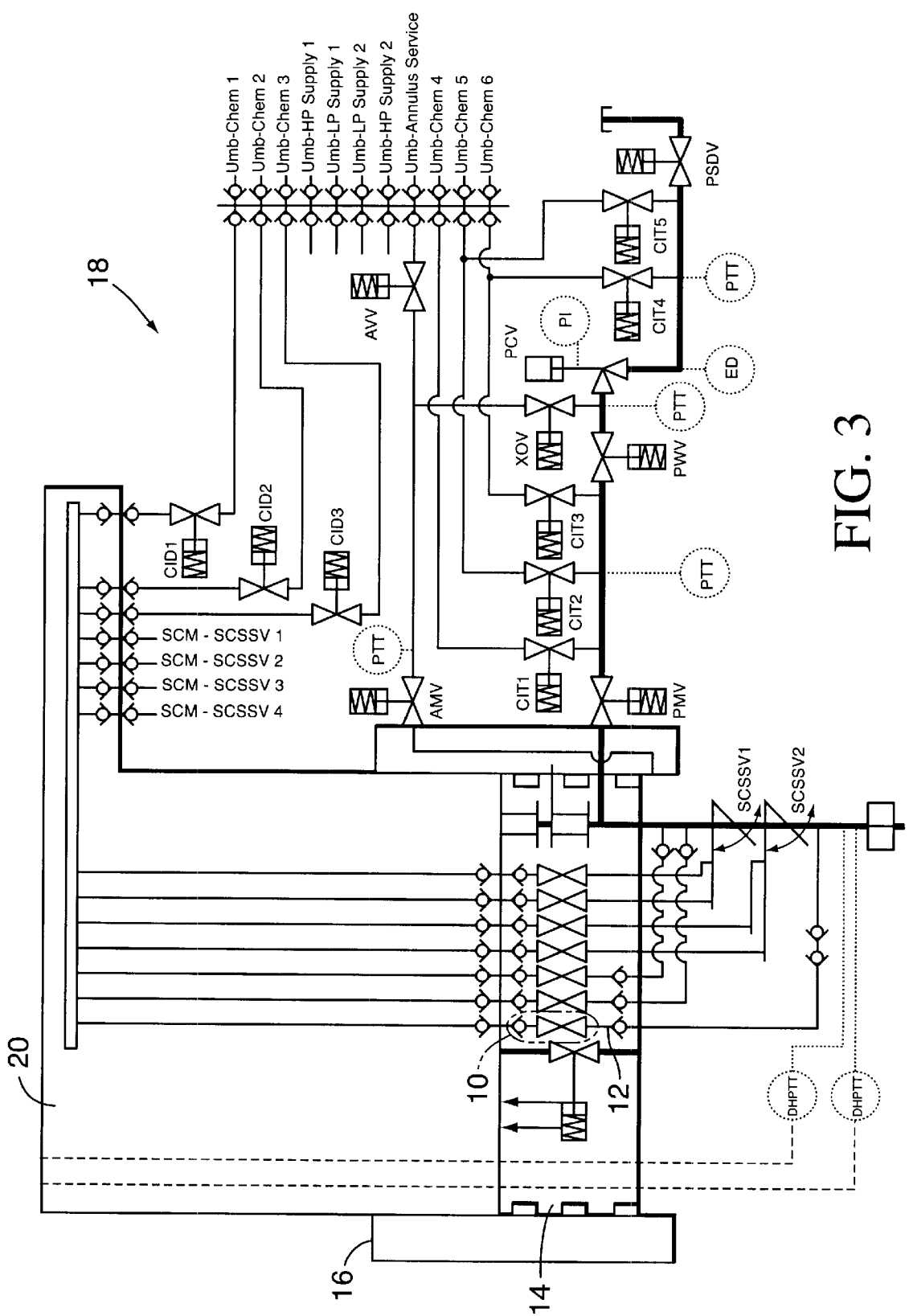
FIG. 3 is a schematic representation of the flow completion system of FIG. 1 showing a controls bridge connected to the tubing hanger.

FIG. 3 is a schematic representation of the flow completion system 18 having a controls bridge 20 operatively connected to the tubing hanger 14 and/or the tubing spool 16. The tubing hanger is shown to include several valves 10 installed in respective service and control conduits 12. As will be discussed below, the valve 10 does not require a separate actuation signal to move the poppet and gate closure members between the open and closed positions. Therefore, no additional control conduits need to be routed through the controls bridge 20 to the valves. Also, each valve 10 provides a double barrier between service and control conduit 12 and the environment. Therefore, no pressure plug or other temporary closure device needs to be installed in the service and control conduits when the controls bridge, or other device is removed from the tubing hanger or the tubing spool.

Figure 4:
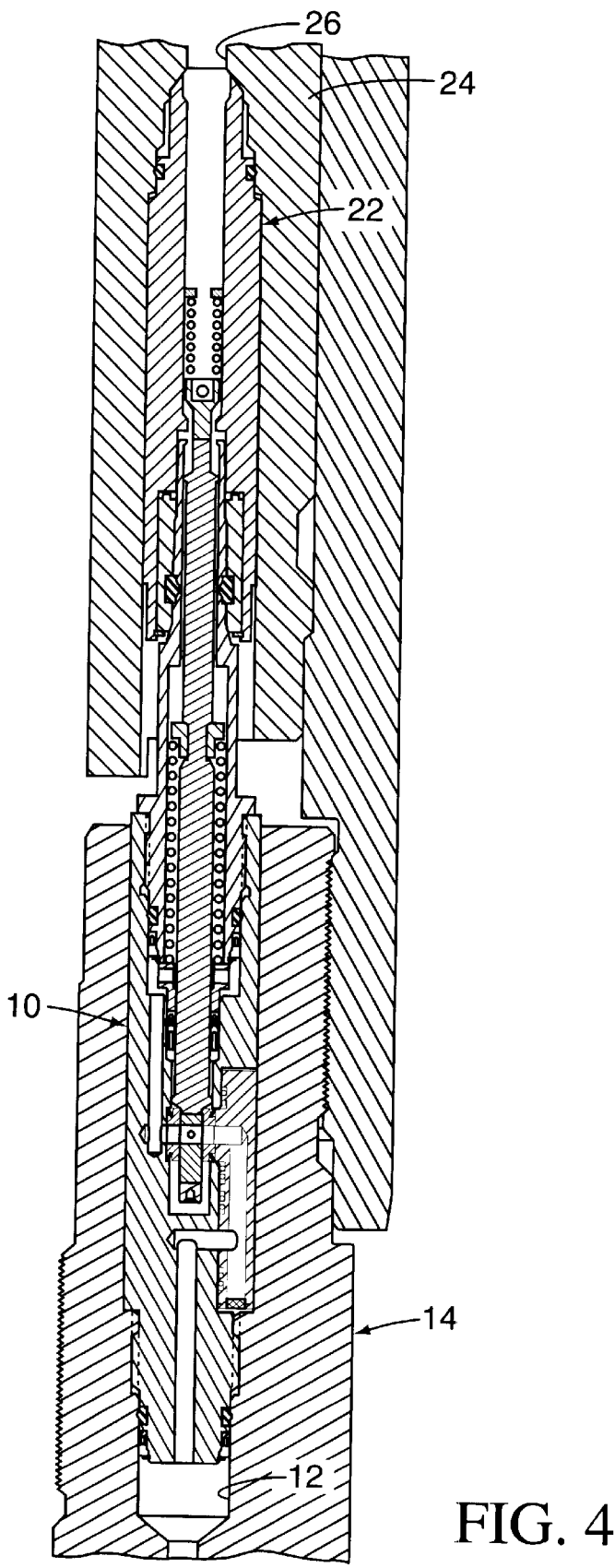
FIG. 4 is a cross-sectional view of one embodiment of the valve of the present invention shown engaged by a female member of a hydraulic coupling.

Referring to FIG. 4, the valve 10 is opened upon being engaged by a female member 22 of a conventional hydraulic coupling. In the example shown, the female coupling member 22 is carried by a tool 24, such as a tubing hanger running tool. However, the female coupling member 22 may be mounted in any appropriate device which one may desire to operatively connect with the tubing hanger 14 and/or the service and control conduits 12, such as a tree cap, a controls bridge, or any other appropriate device. The female coupling member 22 communicates with a service and control line 26 in the tool 24. Thus, when the female coupling member 22 and the valve 10 are properly mated, a fluid path is established between the service and control line 26 in the tool 24 and the service and control conduit 12 in the tubing hanger 14.

Figures 5, 5A:
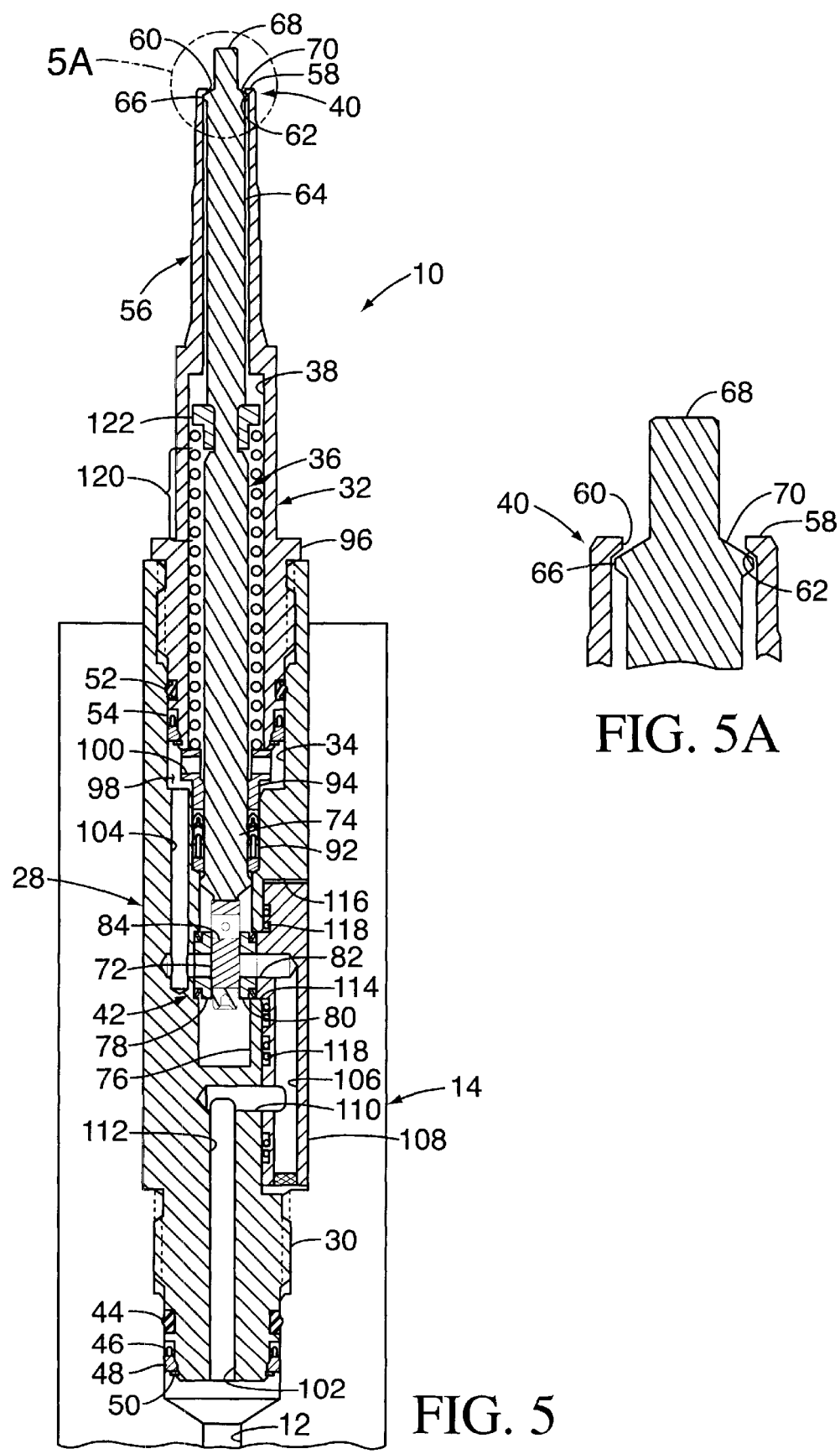
FIG. 5 is a cross-sectional view of the valve shown in FIG. 4.
FIG. 5A is an enlarged view of the poppet closure member component of the valve shown in FIG. 5.

Referring to FIG. 5, a preferred embodiment of the valve 10 comprises a cylindrical valve body 28 which is secured within the upper end of the service and control conduit 12 such as by threads 30, a cylindrical valve bonnet 32 which is preferably threaded into an axial bore 34 that is formed in an upper end of the valve body, an elongated valve stem 36 which is movably mounted in a stepped cylindrical bore 38 that extends axially through the valve bonnet, a poppet type closure member 40 which is connected to an upper end of the valve stem, and a gate type closure member 42 which is connected to a lower end of the valve stem. The valve body 28 is sealed to the service and control conduit 12 with a first annular seal 44, such as a non-metallic S-type seal, and preferably also a second annular seal 46, such as a U-shaped lip seal. While the first seal 44 is received within a corresponding recess that is formed in the outer diameter of the valve body 28, the second seal 46 is preferably held in place by an annular retainer 48 which is secured to the outer diameter of the valve body by a retainer ring 50. Similarly, the valve bonnet 32 is ideally sealed to the valve body 28 with first and preferably also second annular seals 52 and 54 which are similar to the first and second seals 44 and 46, respectively. It should be understood, however, that any suitable type, number, or combination of seals could be used for sealing the valve body 28 to the service and control conduit 12 and for sealing the valve bonnet 32 to the valve body.

The poppet closure member 40 is ideally formed on a part of the valve stem 36 which is positioned within a portion of the valve bonnet 32 that is adapted to be engaged by a corresponding external coupling member. In the embodiment of the invention depicted in FIG. 5, therefore, the valve bonnet 32 comprises an upper male coupling portion 56 that is adapted to be engaged by the female coupling member 22 shown in FIG. 4. The male coupling portion 56 terminates in a radially inwardly extending lip 58 which defines an opening 60 through the valve bonnet 32. The lip 58 forms a poppet seat 62 which optimally has a sealing surface formed thereon. Furthermore, the valve stem 36 comprises an upper section 64 which includes an annular poppet head 66 and an actuating tip 68 that protrudes through the opening 60. The poppet head 66 includes an upper, preferably conical surface 70 which is adapted to seal against the seat 62 when the poppet valve 40 is in the closed position.

The gate closure member 42 comprises a gate 72 which is connected to a lower end 74 of the valve stem 36 that extends into a gate chamber 76 which is formed in the valve body 28. The gate 72 is slidably disposed between two annular, preferably floating seats 78 and 80 which are mounted in corresponding annular recesses that are formed in the valve body 28. Each seat 78, 80 is ideally biased toward the gate 72 by a Belleville washer or similar means. In addition, each seat 78, 80 includes a through bore which is aligned with a lateral branch 82 of a flow passage that extends through the valve 10, as will be described below. In accordance with the present invention, when the poppet closure member 40 is in the closed position, the gate closure member 42 will also be in a closed position, in which a lateral hole 84 in the gate is offset from the lateral branch 82 of the flow passage, as shown in FIG. 5.

Figure 6A:
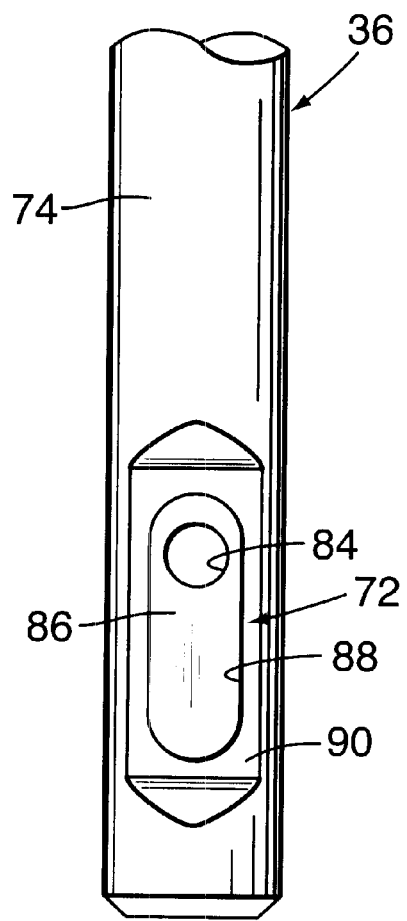
FIGS. 6A and 6B are side and front elevational views, respectively, of the lower portion of the stem component of the valve shown in FIG. 4.
Figure 6B:
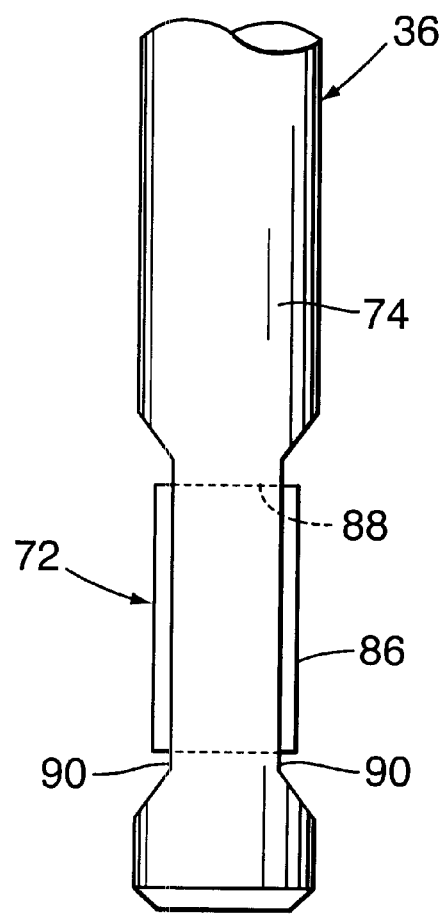

Referring to FIGS. 6A and 6B, the gate 72 of the preferred embodiment of the invention comprises a generally flat, oval shaped insert 86 which is received in a corresponding opening 88 that is formed in the lower end 74 of the stem 36. The opening 88 is preferably formed through opposing flat portions 90 which are machined into the stem 36. In addition, the insert 86 preferably protrudes slightly beyond the flat portions 90. Alternatively, the gate 72 may be a conventional gate which is attached to the lower end 74 of the stem 36 by threads, a T-slot, or other suitable means.

Referring again to FIG. 5, the valve stem 36 is sealed to the valve body 28 above the gate chamber 76 by a suitable stem packing 92. The stem packing 92 is held in position by a gland bushing 94 which in turn is secured within the valve body 28 by the bottom of the valve bonnet 32. To prevent improper loading of the stem packing 92, the valve bonnet 32 is threaded into the valve body 28 until a radial flange 96 on the valve bonnet abuts the top of the valve body. The stem packing 92 and the first and second seals 52, 54 define a fluid cavity 98 between the valve body 28 and the valve bonnet 32, and the gland bushing 94 preferably includes one or more holes 100 to allow fluid to flow between the fluid cavity and the cylindrical bore 38 of the valve bonnet.

The poppet closure member 40 and the gate closure member 42 are both positioned across a flow passage through the valve 10 which is formed between the opening 60 in the upper end of the valve bonnet 32 and a port 102 in the lower end of the valve body 28. The flow passage extends from the opening 60 into an annular space between the valve stem 36 and the cylindrical bore 38 of the valve bonnet 32, through the holes 100 in the gland bushing 94, and into the fluid cavity 98. From the fluid cavity 98, the flow passage extends through a number of bores in the valve body 28 to the port 102. Accordingly, the flow passage extends through a first longitudinal bore 104 between the fluid cavity 98 and the lateral branch 82, through the lateral branch 82 and the through bores in the valve seats 78, 80, through a second longitudinal bore 106 which in the embodiment shown extends through a cover plate 108, through a transverse bore 110 which communicates with the second longitudinal bore 106, and through a third longitudinal bore 112 which extends between the transverse bore 110 and the port 102. The first longitudinal bore 104 may actually comprise two or more generally parallel bores which are radially spaced about the axial centerline of the valve 10 and are connected to the lateral branch 82 by one or more transverse branches (not shown). In addition, the second longitudinal bore 106 and the transverse bore 110 may be omitted and the third longitudinal bore 112 instead connected directly to the lateral branch 82.

The cover plate 108 is provided to seal an aperture 114 which is formed in the valve body 28 to facilitate the installation of the valve seats 78, 80. One side of valve body 28 ideally comprises a cutout or recess 116 for receiving the cover plate 108, which is preferably removably attached to the valve body by bolts (not shown). In addition, suitable annular seals 118 are ideally provided between the cover plate 108 and the valve body 28 around each of the lateral branch 82 and the transverse bore 110.

The valve 10 also includes a return biasing means to bias the poppet closure member 40 and the gate closure member 42 into the closed position. In the embodiment of the invention shown in FIG. 5, the return biasing means comprises a compression spring 120 which is positioned around the stem 36 between the gland bushing 94 and a spring bushing 122 that is connected to the stem. The spring 120 will accordingly bias the stem 36 upwardly into the closed position of the valve 10. In this position, the conical surface 70 of the poppet head 66 will seal against the seat 62 and the hole 84 in the gate 72 will be offset from the lateral branch 82. Thus, the flow passage through the valve 10 will be sealed by both the poppet closure member 40 and the gate closure member 42, and the service and control conduit 12 will therefore be isolated from the environment by these two barriers.

Referring again to FIG. 4, when the male coupling portion 56 is engaged by the female coupling member 22, a portion of the female coupling member will push the actuating tip 68 downward and thereby simultaneously move the poppet head 66 off of the poppet seat 62 and the hole 84 in the gate 72 into alignment with the lateral branch 82. In this open position of the valve 10, fluid is now free to flow through the flow passage past both the poppet closure member 40 and the gate closure member 42. Thus, a fluid connection is established between service and control line 26 in the tool 22 and the service and control conduit 12 in the tubing hanger 14. In an alternative embodiment of the invention which is not illustrated in the drawings, the poppet closure member 40 or the gate closure member 42 could be replaced by a check valve, a plug valve, or any other suitable valve which is actuated by axial movement of a valve stem 36.

Figure 7:
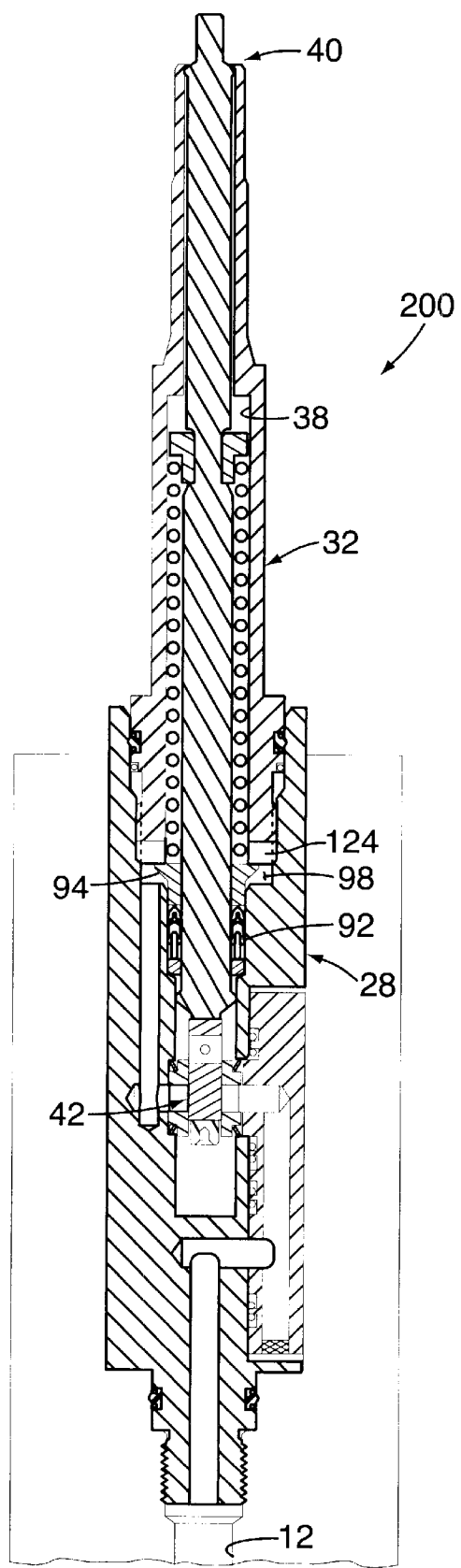
FIG. 7 is a cross-sectional view of an alternate embodiment of the valve of the present invention.

Referring now to FIG. 7, an alternate embodiment of the valve of the present invention is illustrated. The valve of this embodiment, which is indicated generally by reference number 200, is similar in many respects to the valve 10 discussed above. However, the gland bushing 94 of the valve 200 does not comprise any holes to allow fluid to pass from the fluid cavity 98 into the cylindrical bore 38 of the valve bonnet 32. Instead, the lower end of the valve bonnet 32 includes one or more radial slots 124 that extend between the fluid cavity 98 and the cylindrical bore 38. The valve 200 is similar to the valve 10 in all other material respects.

Another embodiment of the valve of the present invention is shown in FIGS. 8 and 9. The valve of this embodiment, which is indicated generally by reference number 300, is also similar in many respects to the valve 10 discussed above. In this embodiment, however, the valve body 28 is preferably sealed to the service and control conduit 12 by a suitable packing 126, and the valve bonnet 32 is preferably sealed to the valve body by a similar packing 128. The packing 126 is ideally retained on the outer diameter of the valve body 28 by a retainer sleeve 130 which in turn is secured to the valve body by a retainer ring 132. In addition, the packing 128 is trapped between the valve body 28 and the outer diameter of the valve bonnet 32 by an upper axial extension 134 of the gland bushing 94. Also, the gland bushing 94 includes a number of axial holes 136 to allow for fluid communication between the fluid cavity 98 and the cylindrical bore 38 of the valve bonnet 32.

Furthermore, in order to simplify the construction of the valve 300, the valve stem 36 includes an upper portion 138 which is threadedly connected to a lower portion 140. In addition, the spring bushing 122 is preferably formed integrally with the upper portion 138. Moreover, the spring bushing 122 of this embodiment may be provided with a number of axial apertures 142 to facilitate the passage of fluid past the spring bushing.

The flow passage of valve 300 is similar to the portion of the flow passage in valve 10 which extends between the gate cavity 76 and the opening 60 in the valve bonnet 32. However, after passing through the first longitudinal bore 104 and the lateral passage 82, the fluid exits a port 144 which is formed in the cover plate 108. The fluid then enters an annular portion of the service and control conduit 12 that is defined between the packing 126 and the outer diameter of the valve body 28. In the embodiment of the invention shown in FIGS. 8 and 9, the a lower portion 146 of the valve body 28 is threaded into the service and control conduit 12. Thus, the valve body 28 preferably includes a suitable bore 148 to facilitate the passage of the fluid past the lower portion 146. Of course, if the valve body 28 is secured to the service and control conduit 12 above the port 144, the lower portion 146, and thus the bore 148, may be omitted.

Figure 10:
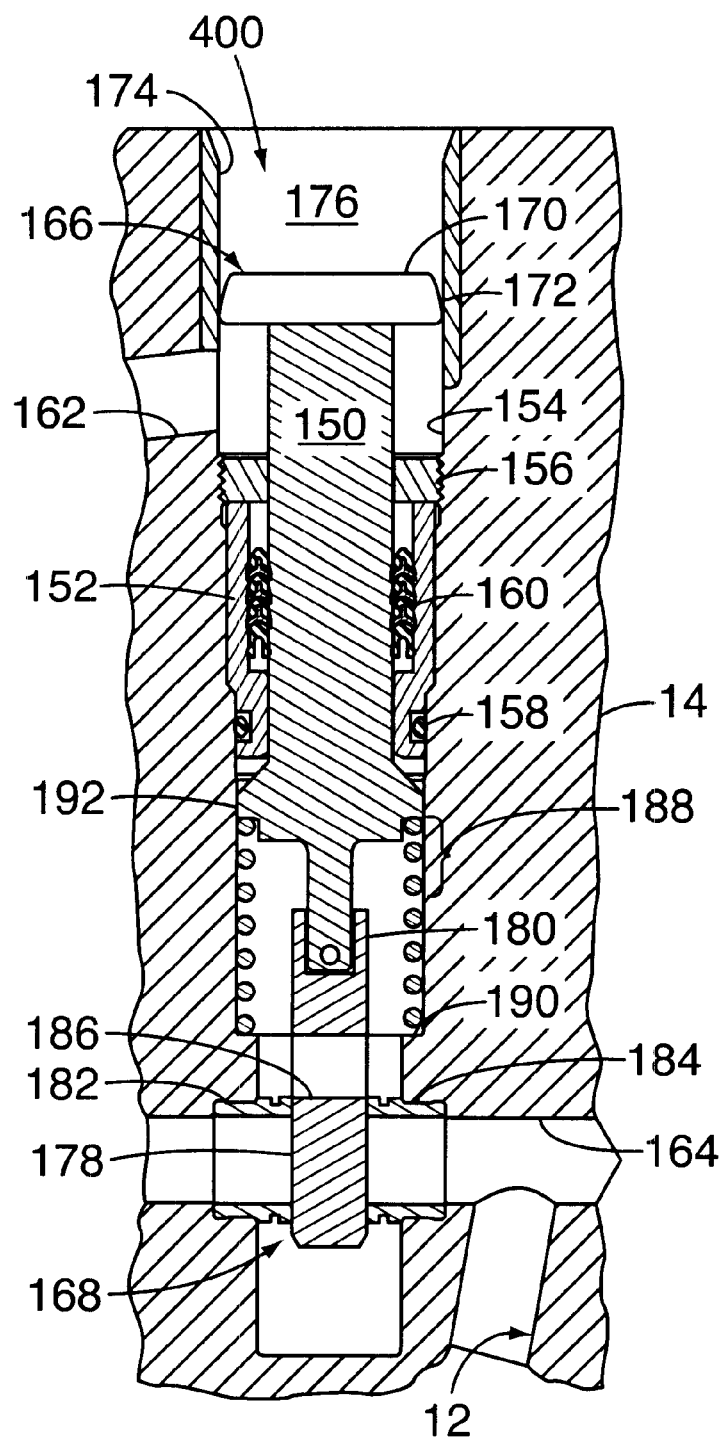
FIG. 10 is a cross-sectional view of yet another embodiment of the valve of the present invention.

Referring now to FIG. 10, an embodiment of the valve of the present invention is depicted which may be conveniently actuated by a stab that is mounted on a tubing hanger running tool, a tree or any other suitable component. The valve of this embodiment, which is indicated generally by reference number 400, is shown to comprise a valve stem 150 which is slidably received in a retainer sleeve 152 that is secured in a preferably cylindrical valve cavity 154 by a retainer nut 156. The retainer sleeve 152 is ideally sealed to the valve cavity 154 by a suitable seal 158, and the valve stem 150 is optimally sealed to the retainer sleeve by an appropriate packing 160. The valve cavity 154 is preferably formed coaxially with a portion of the service and control conduit 12 that extends to the top or outer surface of the tubing hanger 14. In addition, the valve cavity 54 is shown to intersect preferably two spaced apart generally lateral upper and lower branches 162, 164 of the service and control conduit 12. Furthermore, the valve 400 comprises a poppet closure member 166 which is connected to the top of the valve stem 150 and is preferably positioned to control the flow through the upper branch 162, and a gate closure member 168 which is connected to the lower end of the valve stem and is preferably positioned to control the flow through the lower branch 164.

The poppet closure member 166 comprises a generally disc-shaped poppet head 170 which is connected to the top of the valve stem by suitable means, such as one or more cap screws (not shown). The poppet head 170 includes a radially outwardly facing sealing lip 172 that is adapted to engage a corresponding poppet seat 174 which is installed or formed in a top branch 176 of the service and control conduit 12. The poppet seat 174 of this embodiment is in the form of a cylindrical sealing surface which defines an opening through the top branch 176, and when the valve 400 is in the closed position, the sealing lip 172 will seal against the sealing surface 174 and thereby block the passage of fluid between the top branch 176 and the upper branch 162.

The gate closure member 168 comprises a gate 178 which is connected to the bottom of the valve stem 150 by suitable means, such as a yoke and pin connection 180. The gate 178 is slidably disposed between two valve seats 182, 184 which are mounted in corresponding recesses that extend laterally from the valve cavity 154 into the tubing hanger 14. Each seat 182, 184 is preferably sealed to its corresponding recess by a suitable seal (not shown), and each seat includes a through bore which is aligned with the lower branch 164 of the service and control conduit 12. When the valve 400 is in the closed position, a transverse through hole 186 in the gate 178 will be offset from the lower branch 164 and thereby block the passage of fluid through the lower branch.

The valve 400 further comprises a return biasing means for urging the valve stem 150 into the closed position. In the embodiment of the invention depicted in FIG. 10, the return biasing means comprises a compression spring 188. The compression spring 188 is operatively engaged between an annular step 190 that is formed in the valve cavity 154 and a flange 192 that extends radially from the valve stem 150.

Upward movement of the valve stem is restricted by the engagement of the flange 192 with the bottom of the retainer sleeve 152.

Figure 11A:
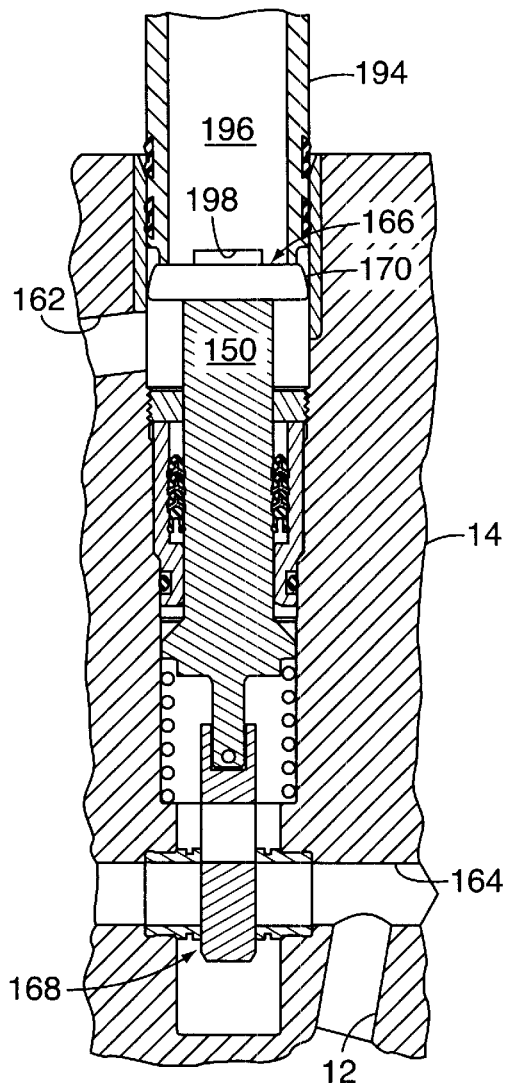
FIGS. 11A and 11B are sequential views showing the valve of FIG. 10 being actuated by a stab.
Figure 11B:
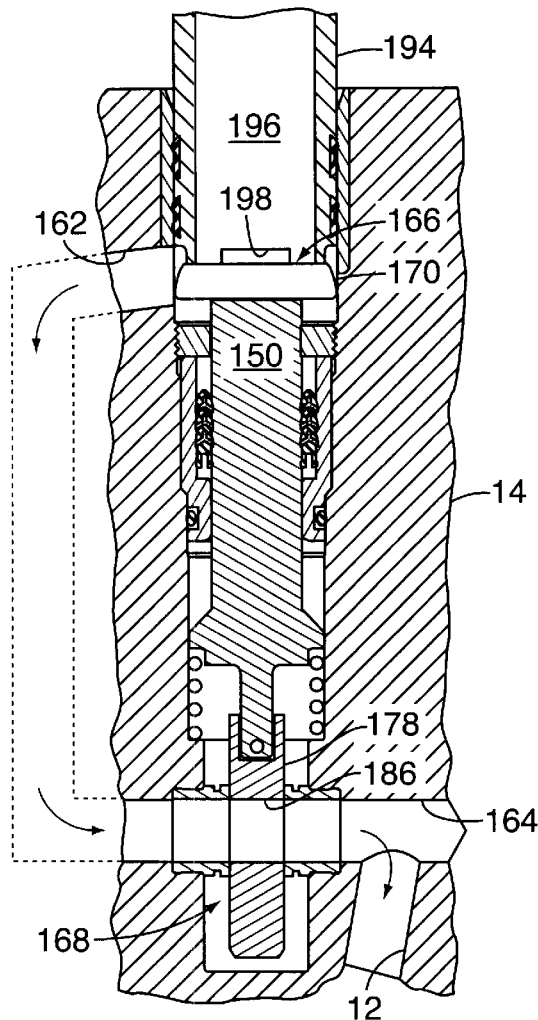

The operation of the valve 400 will now be described with reference to FIGS. 11A and 11B. In the rest position of the valve 400, both the poppet closure member 166 and the gate closure member 168 are closed. These closure members therefore provide two barriers between the service and control conduit 12 and the external environment. In order to open the valve 400, a seal stab 194 which is mounted on a tubing hanger running tool, a tree or any other suitable component is lowered into the top branch 176 of the service and control conduit 12 and against the poppet head 170. The stab 194 may be either fixed or hydraulically extendable and ideally includes an axial bore 196 and a number of lateral apertures 198 extending between the axial bore and the outer diameter of the stab. Further downward movement of the stab 194 will push the poppet head 170, and thus the valve stem 150 downward into the open position of the valve 400, which is shown in FIG. 11B. In this position, the sealing lip 172 of the poppet head 170 is positioned below at least a portion of the upper branch 162, and the through hole 186 in the gate 178 is aligned with the lower branch 164. Consequently, fluid within the axial bore 196 will flow through the apertures 198, past the poppet head 170 through the upper branch 162, through an intermediate branch that extends between the upper and lower branches 162, 164 (which is shown in phantom in FIG. 11B), through the lower branch 164 and into the remainder of the service and control conduit 12. Of course, the fluid may flow in the opposite direction if need be.

It should be recognized that, while the present invention has been described in relation to the preferred embodiments thereof, those skilled in the art may develop a wide variation of structural and operational details without departing from the principles of the invention. For example, the various elements shown in the different embodiments may be combined in a manner not illustrated above. Therefore, the appended claims are to be construed to cover all equivalents falling within the true scope and spirit of the invention.

We claim:

1. A valve for controlling the flow of fluid through a component which includes a flow conduit extending therethrough, the valve comprising:

a first closure member for controlling the flow of fluid through the conduit;

a second closure member for controlling the flow of fluid through the conduit; and a valve stem which is connected to both the first and second closure members;

wherein the stem is responsive to an external force to move the first and second closure members from a first position to a second position; and wherein one of the first and second positions corresponds to an open position of the valve, in which the fluid is permitted to flow through the conduit past both the first and second closure members, and the other position corresponds to a closed position of the valve, in which the fluid is blocked from flowing through the conduit by both the first and second closure members.

2. The valve of claim 1, further comprising means for biasing the first and second closure members into the first position.

3. The valve of claim 1, wherein the first closure member comprises a gate which is slidably positioned between a pair of seats which each comprise a through bore that is in fluid communication with the conduit.

4. The valve of claim 1, wherein the second closure member comprises a poppet head which is adapted to engage a corresponding poppet seat surrounding an opening that is in fluid communication with the conduit.

5. The valve of claim 4, further comprising a valve bonnet which includes a male coupling portion that is adapted to connect with a female coupling member of a hydraulic coupler.

6. The valve of claim 5, wherein the valve stem comprises an actuating tip that is adapted to be engaged by a corresponding portion of the female coupling member to move the valve stem and thus the first and second closure members from the first position to the second position.

7. The valve of claim 4, wherein the poppet head is adapted to be engaged by a stab to move the valve stem and thus the first and second closure members from the first position to the second position.

8. A valve for controlling the flow of fluid through a component which includes a flow conduit extending therethrough, the valve comprising;

a valve body which is secured within the conduit and which includes at least one flow bore that communicates with the conduit;

a valve bonnet which is connected to the valve body and which includes a longitudinal bore that extends therethrough;

the at least one flow bore communicating with the longitudinal bore to define a flow passage through the valve;

a first closure member positioned in the flow passage;

a second closure member positioned in the flow passage; and a valve stem which is connected to both the first closure member and the second closure member and which is responsive to an external force to move the first and second closure members from a first position to a second potion;

wherein one of the first and second positions corresponds to an open position of the valve, in which the fluid is permitted to flow through the flow passage past both the first and second closure members, and the other position corresponds to a closed position of the valve, in which the fluid is blocked from flowing through the flow passage by both the first and second closure members.

9. The valve of claim 8, further comprising means for biasing the first and second closure members into the first position.

10. The valve of claim 8, wherein the first closure member comprises a gate which is slidably positioned between a pair of seats which each comprise a through bore that is in fluid communication with the flow passage.

11. The valve of claim 8, wherein the second closure member comprises a poppet head which is adapted to engage a corresponding poppet seat surrounding an opening that is in fluid communication with the flow passage.

12. The valve of claim 11, wherein the valve bonnet includes a male coupling portion that is adapted to connect with a female coupling member of a hydraulic coupler.

13. The valve of claim 12, wherein the valve stem comprises an actuating tip that is adapted to be engaged by a corresponding portion of the female coupling member to move the valve stem and thus the first and second closure members from the first position to the second position.

14. The valve of claim 11, wherein the poppet head is adapted to be engaged by a stab to move the valve stem and thus the first and second closure members from the first position to the second position.

15. In combination with a flow completion system having a tubing hanger which is landed in a tubing spool and which includes at least one service and control conduit extending therethrough, the improvement comprising a valve which comprises:

a first closure member for controlling the flow of fluid through the conduit;

a second closure member for controlling the flow of fluid through the conduit; and a valve stem which is connected to both the first and second closure members;

wherein the stem is responsive to an external force to move the first and second closure members from a closed position, in which the fluid is blocked from flowing through the conduit by both the first and second closure members, to an open position, in which the fluid is permitted to flow through the conduit past both the first and second closure members.

16. The flow completion system of claim 15, further comprising means for biasing the first and second closure members into the closed position.

17. The flow completion system of claim 15, wherein the first closure member comprises a gate which is slidably positioned between a pair of seats which each comprise a through bore that is in fluid communication with the conduit.

18. The flow completion system of claim 15, wherein the second closure member comprises a poppet head which is adapted to engage a corresponding poppet seat surrounding an opening that is in fluid communication with the conduit.

19. The flow completion system of claim 18, further comprising a valve bonnet which includes a male coupling portion that is adapted to connect with a female coupling member of a hydraulic coupler.

20. The flow completion system of claim 19, wherein the valve stem comprises an actuating tip that is adapted to be engaged by a corresponding portion of the female coupling member to move the valve stem and thus the first and second closure members from the closed position to the open position.

21. The flow completion system of claim 18, wherein the poppet head is adapted to be engaged by a stab to move the valve stem and thus the first and second closure members from the closed position to the open position.

* * * * *